United States Patent [19]
Hanaoka et al.

[11] Patent Number: 5,570,211
[45] Date of Patent: Oct. 29, 1996

[54] COLOR LIQUID CRYSTAL DISPLAY DEVICE USING BIREFRINGENCE

[75] Inventors: Kazutaka Hanaoka; Hidefumi Yoshida; Kimiaki Nakamura; Hideaki Tsuda; Hideo Chida, all of Kawasaki, Japan

[73] Assignee: Fujitsu Limited, Japan

[21] Appl. No.: 251,865

[22] Filed: May 31, 1994

[30]  Foreign Application Priority Data

Mar. 2, 1994 [JP] Japan .................................. 6-032703

[51] Int. Cl.$^6$ ........................... G02F 1/133; G02F 1/1337
[52] U.S. Cl. ................................ 359/53; 359/73; 359/75; 359/76; 359/78
[58] Field of Search .................... 359/53, 73, 76, 359/75, 78

[56]  References Cited

U.S. PATENT DOCUMENTS

| | | | |
|---|---|---|---|
| 4,443,065 | 4/1984 | Funada et al. | 359/53 |
| 4,844,569 | 7/1989 | Wada et al. | 359/53 |
| 5,119,216 | 6/1992 | Wada et al. | 359/53 |
| 5,223,963 | 6/1993 | Okada et al. | 359/76 |
| 5,280,375 | 1/1994 | Tsuda et al. | 359/76 |

FOREIGN PATENT DOCUMENTS

| | | |
|---|---|---|
| 0481700 | 10/1991 | European Pat. Off. . |
| 4-188113 | 7/1992 | Japan . |

OTHER PUBLICATIONS

A Full–Color TFT–LCD With a domain devided TN Structure Late—News paper: Koike et al.

*Primary Examiner*—Anita Pellman Gross
*Assistant Examiner*—Fetsum Abraham
*Attorney, Agent, or Firm*—Greer, Burns & Crain, Ltd.

[57]  ABSTRACT

A color liquid crystal display device includes a compensation liquid crystal panel having a first thickness and a first predetermined twist angle of liquid crystal molecules in a first direction, a driver liquid crystal panel having a second thickness identical to the first thickness and a second predetermined twist angle of liquid crystal molecules in a second, opposite direction such that the second predetermined twist angle is identical with the first predetermined twist angle in terms of magnitude, a first polarizer provided on the compensation liquid crystal panel, and a second polarizer provided on the driver liquid crystal panel.

15 Claims, 17 Drawing Sheets

FIG.IA PRIOR ART   FIG.IB PRIOR ART
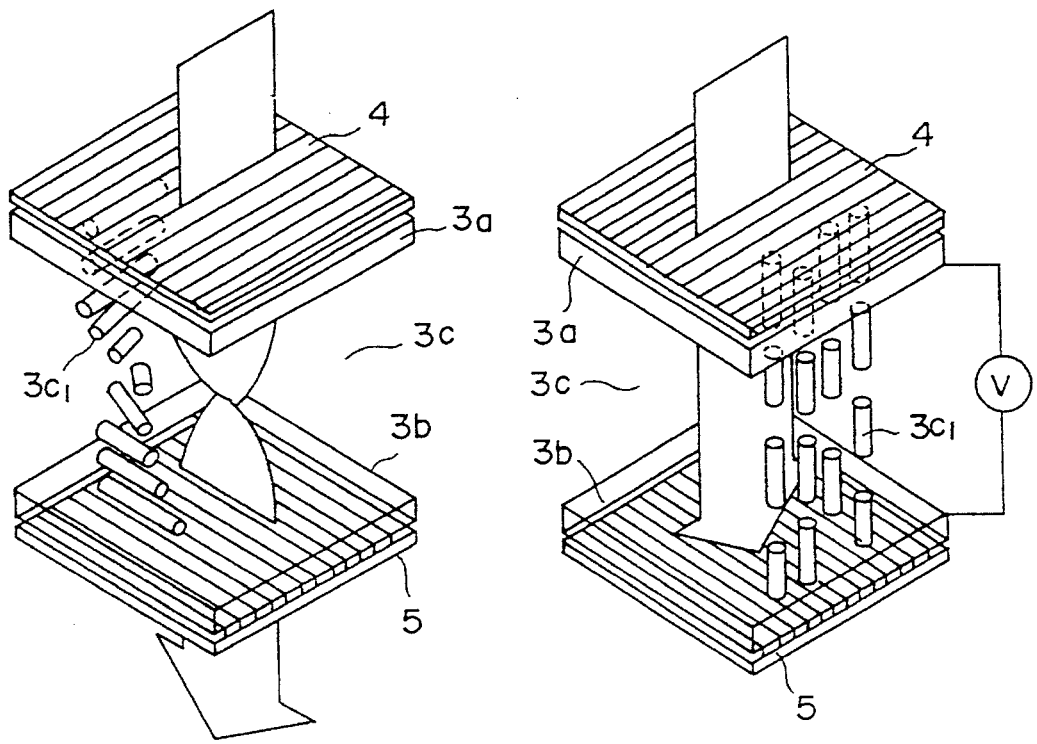
FIG. 2   PRIOR ART
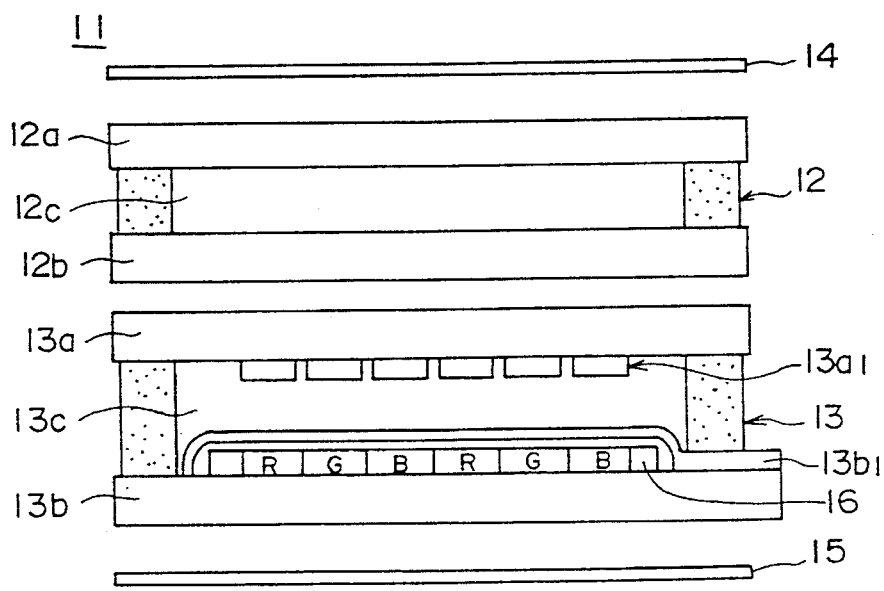

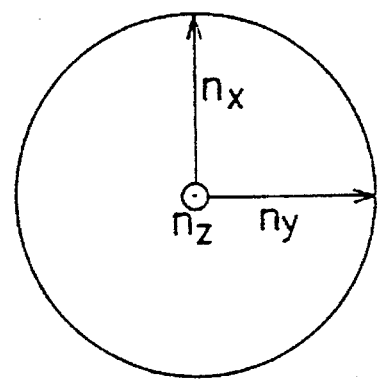
FIG. 15A  $n_x = n_y > n_z$
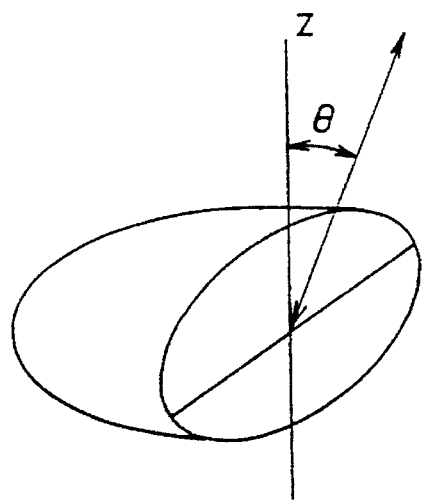
FIG. 15B
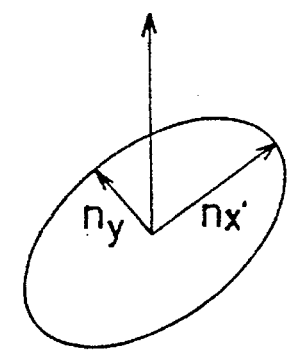
FIG. 15C
$\Delta n' = n_x' - n_y'$

COLOR LIQUID CRYSTAL DISPLAY DEVICE USING BIREFRINGENCE

BACKGROUND OF THE INVENTION

The present invention generally relates to liquid crystal display devices and more particularly to a color liquid crystal display device that uses birefringence.

Color liquid crystal display devices generally use color filters for providing color picture representation. In a full color display device, color filters for three primary colors such as red, green and blue are provided in each pixel. On the other hand, such a construction generally has a problem of relatively coarse resolution associated with the use of three color filters in each of the pixels.

While such color liquid crystal display devices are successfully used as a display device of various information processing devices such as a personal computer that illuminates the display device from behind by a backlight, the use of color filters causes a problem of unwanted optical absorption particularly in the portable terminals that use reflected light for the display of information. In the liquid crystal display devices that use reflected light, high luminance of white is an essential factor in view point of relatively dark representation associated with the use of reflected light.

As a method to achieve color display of images without using color filters, it is known to use birefringence of liquid crystals. In the color liquid crystal display devices that use birefringence for the representation of color images, the light incident to a liquid crystal cell experiences a decomposition to an ordinary ray and an extraordinary ray having respective, different velocities. Thus, upon propagation through the liquid crystal cell, there occurs a retardation between the ordinary ray and the extraordinary ray. Upon exiting from the liquid crystal cell, the ordinary ray and the extraordinary ray, shifted with each other in phase, cause interference and an interference color is obtained.

Generally, the color liquid crystal display devices that use birefringence for the color representation include ECB (electrically controlled birefringence) devices, wherein the ECS devices produce interference color by controlling the birefringence of the liquid crystal. In other words, various colors are obtained by controlling the strength of the electric field.

For example, there is a device that operates based upon the birefringence caused in a liquid crystal cell of the super twisted nematic liquid crystals wherein the liquid crystal molecules are arranged with a twist angle of 180°–360°. By setting the plane of polarization to be offset from the direction of the principal axis of the liquid crystal molecule at the surface of the electrode that contacts with the liquid crystal layer, it is possible to obtain optical interference due to the birefringence of the liquid crystal.

Generally, the ECB device of the aforementioned type is suitable for providing red, green and blue colors in the reflection type display devices, while such a device has a drawback of poor performance in displaying white or black colors.

FIGS. 1A and 1B show the principle of ordinary liquid crystal display panel.

Referring to FIGS. 1A and 1B, a liquid crystal layer $3c$ is sandwiched by a pair of glass substrates $3a$ and $3b$ having respective inner surfaces, wherein an alignment layer (not shown) is provided on each of the inner surfaces such that molecules $3c_1$ of the liquid crystal are aligned as indicated in FIG. 1A in the state that there is no electric field applied to the liquid crystal layer. Thus, the liquid crystal molecules $3_1$ adjacent to the glass substrate $3a$ are aligned in a first direction while the liquid crystal molecules $3_1$ adjacent to the glass substrate $3b$ are aligned in a second, perpendicular direction. Further, a first polarizer 4 is disposed above the glass substrate $3a$ with the plane of polarization coincident to the direction of alignment of the liquid crystal molecules $3_1$ adjacent to the substrate $3a$, and a second polarizer 5 is provided below the glass substrate $3b$ with the plane of polarization coincident to the direction of alignment of the liquid crystal molecules $3_1$ adjacent to the substrate $3b$.

Thus, the optical beam incident to the liquid crystal layer $3c$ from the upward direction as indicated in FIG. 1A by an arrow, experiences polarization in the polarizer 4 and propagates through the liquid crystal layer $3c$ while rotating the plane of polarization and exits through the polarizer 5. In other words, FIG. 1A shows the state that the liquid crystal panel is transparent to the transmitting light.

In the state of FIG. 1B, an electric field is applied to the liquid crystal layer and the liquid crystal molecules $3c_1$ are aligned in the direction perpendicular to the plane of the liquid crystal layer $3c$. Thus, the optical beam incident to the liquid crystal layer $3c$ maintains the plane of polarization coincident to the plane of polarization of the polarizer 5 and is cutoff at the lower polarizer 5. In other words, FIG. 1B shows the state wherein the liquid crystal display panel shuts the transmission of optical beam.

FIG. 2 shows a conventional DSTN (double-layered super twisted nematic) color display device 11 for use in a transmission type color liquid crystal display devices.

Referring to FIG. 2, the color liquid crystal display device 11 includes a stacking of a first liquid crystal panel 12 and a second liquid crystal panel 13, with a first polarizer plate 14 disposed above the panel 12 and a second polarizer plate 15 disposed below the panel 13. As usual, the liquid crystal panel 12 is formed of a pair of glass substrates $12a$ and $12b$ sandwiching a liquid crystal layer $12c$. Similarly, the liquid crystal panel 13 is formed of a pair of glass substrates $13a$ and $13b$ sandwiching a liquid crystal layer $12c$. In the illustrated example, the liquid crystal panel 13 acts as a driver panel and transparent electrodes $13a_1$ are provided on the glass substrate $13_1$. Similarly, transparent electrodes $13b_1$ are provided on the glass substrate $13b$. Further, a color filter (RGB filter) 16 is provided on the glass substrate $13b$.

In the panel of FIG. 2, it should be noted that the optical beam that is incident to the display device 11 is colored according to the color of the filter 16 upon passage therethrough, and a desired color image is displayed. The upper liquid crystal panel 12 is provided for eliminating unwanted coloring that may occur when the optical beam passes through the liquid crystal layer $13c$ as a result of birefringence. In order to avoid unwanted coloring, the panels 12 and 13 are formed to have a thickness d set smaller than about 6 μm to minimize retardation represented as $_A$n·d, wherein $_A$n represents the birefringence. Generally, the thickness d is set to satisfy a relationship of $_A$n·d ≤ 1000 nm.

While the liquid crystal display device 11 of FIG. 2 is successfully used in the liquid crystal color display devices of transmission type, the device has a drawback when used in the reflection type liquid crystal display devices that the color filter 16 provides unwanted absorption of light and the displayed image tends to become dark as described already. It should be noted that luminance of light decreases by two-thirds upon passage through the RGB color filter 16. In such reflection type devices that lacks backlight, a high luminance of white is particularly important.

FIG. 3 shows another known color liquid crystal display device 20 that uses birefringence as disclosed in the Japanese Laid-open Patent Publication 4-188113.

Referring to FIG. 3, the device is of the ECB (electrically controlled birefringence) type and includes a main substrate 21 on which a data electrode 21b is provided, wherein the data electrode 21b acts also as a reflector and is covered by a molecular alignment layer 21a.

Above the substrate 21, there is provided another, second substrate 22 acting as a polarizer, wherein the polarizer 22 carries a transparent electrode 22 on each of upper and lower major surfaces such that the electrode 22 is covered by a molecular alignment film 22a. Further, there is provided still other, third substrate 23 above the polarizer 22 such that the substrate 23 carries a transparent electrode 23b covered by a molecular alignment layer 23a. Thus, a liquid crystal layer 24a is sandwiched between the substrate 21 and the substrate 22, and a liquid crystal layer 24b is sandwiched between the substrate 22 and the substrate 23. Further, another polarizer 25 is disposed above the substrate 23, wherein the plane of polarization is set orthogonal in the polarizer 22 and the polarizer 25. A liquid crystal that changes refractive index in response to the electric field is used for the liquid crystal layers 24a and As indicated in FIG. 3, the molecular alignment layers 21a, 22a and 23a provide a vertical alignment to the liquid crystal molecules in the liquid crystal layers 24a and 24b when in the unbiased state as indicated in a region A of FIG. 3, and the optical beam passes through the liquid crystal layers 24a and 24b without experiencing substantial birefringence. As the plane of polarization is set orthogonal between the polarizer 22 and the substrate 23, the optical beam incident to the region A is effectively cutoff at the polarizer 22 and the region A shows a black appearance. When a voltage is applied across the electrodes 21a and 22a, and between the electrodes 22a and 23a, the liquid crystal molecules are no longer vertical in the layers 24a and 24b, and retardation occurs in the liquid crystal layers 24a and 24b. Thus, a color is obtained in the optical beam exiting from a region B in FIG. 3.

By stacking two liquid crystal layers 24a and 24b, it is possible to improve the purity of color. On the other hand, the device of FIG. 3 has a drawback in that it cannot provide desired bright white that is needed by the reflection type liquid crystal display device.

In the Japanese Laid-open Patent Publication 4-188113, it is also described that the direction of the liquid crystal molecules may not be perpendicular to the plane of the substrate. Even in such a case, the reference merely proposes to stack two liquid crystal cells with identical direction of twisting of the liquid crystal molecules.

SUMMARY OF THE INVENTION

Accordingly, it is a general object of the present invention to provide a novel and useful color liquid crystal display device wherein the foregoing problems are eliminated.

Another and more specific object of the present invention is to provide a color liquid crystal display device suitable for use in reflection type display devices.

Another object of the present invention is to provide a color liquid crystal display device using birefringence, wherein the brightness of white is improved.

Another object of the present invention is to provide a color liquid crystal display device, comprising:

a first liquid crystal panel having upper and lower major surfaces for accommodating liquid crystal molecules, said first liquid crystal panel having a first thickness and a first predetermined twist angle of liquid crystal molecules in a first direction;

a second liquid crystal panel having upper and lower major surfaces for accommodating liquid crystal molecules, said second liquid crystal panel having a second thickness identical to said first thickness and a second predetermined twist angle of liquid crystal molecules in a second, opposite direction such that said second predetermined twist angle is identical with said first predetermined twist angle in terms of magnitude;

one of said first and second liquid crystal panels carrying electrode means for applying an electric field to said liquid crystal molecules therein;

said first and second liquid crystal panels being stacked such that said first liquid crystal panel is provided on said second liquid crystal panel to form a liquid crystal panel assembly;

a first polarizer provided on said first liquid crystal panel with a first polarization plane; and a second polarizer provided on said second liquid crystal panel with a second polarization plane;

wherein said first and second polarizers being disposed such that said first polarization plane and said second polarization plane are substantially parallel with each other.

According to the present invention, it is possible to obtain a bright white representation or clear black representation as a result of compensation of the polarization plane in the second liquid crystal panel, while realizing a color representation as a result of birefringence in the first and second liquid crystal panels. More specifically, the polarization plane of the optical beam impinging upon the second liquid crystal panel from the downward direction experiences a predetermined rotation in the second direction in correspondence to the twist of the liquid crystal molecules in the second liquid crystal panel, and further a predetermined, compensating rotation in the first direction in the first liquid crystal cell in correspondence to the twist of the liquid crystal molecules in the first direction, wherein the magnitude of rotation of the polarization plane in the first direction and the magnitude of the polarization plane in the second direction are identical with each other in the unbiased state of the liquid crystal panel. It should be noted that the twist angle in the first liquid crystal panel and the twist angle in the second liquid crystal panel have the same magnitude but opposite directions, and that the thickness of the first liquid crystal panel and the thickness of the second liquid crystal panel are set identical. Thus, the optical beam passing successively through the second and first liquid crystal panels after passing through the second polarizer, has a plane of polarization coincident to that of the first polarizer in the unbiased state of the liquid crystal panel. Thus, a bright white is obtained as a result. Upon energization of any of the first and second liquid crystal panels, a retardation is induced and desired color representation is obtained without using color filters. By providing a reflector below the second polarizer, it is possible to construct a reflection type color liquid crystal display device.

Other objects and further features of the present invention will become apparent from the following detailed description when read in conjunction with the attached drawings.

BRIEF DESCRIPTION OF THE DRAWINGS

FIGS. 1A and 1B are diagrams showing the principle of the liquid crystal display device;

FIG. 2 is a diagram showing the construction of a conventional color liquid crystal display device that uses color filter;

FIGS. 15A–15C show the principle of a retardation film used in the liquid crystal display device of FIG. 14;

DETAILED DESCRIPTION PREFERRED EMBODIMENTS.

Figure 3:
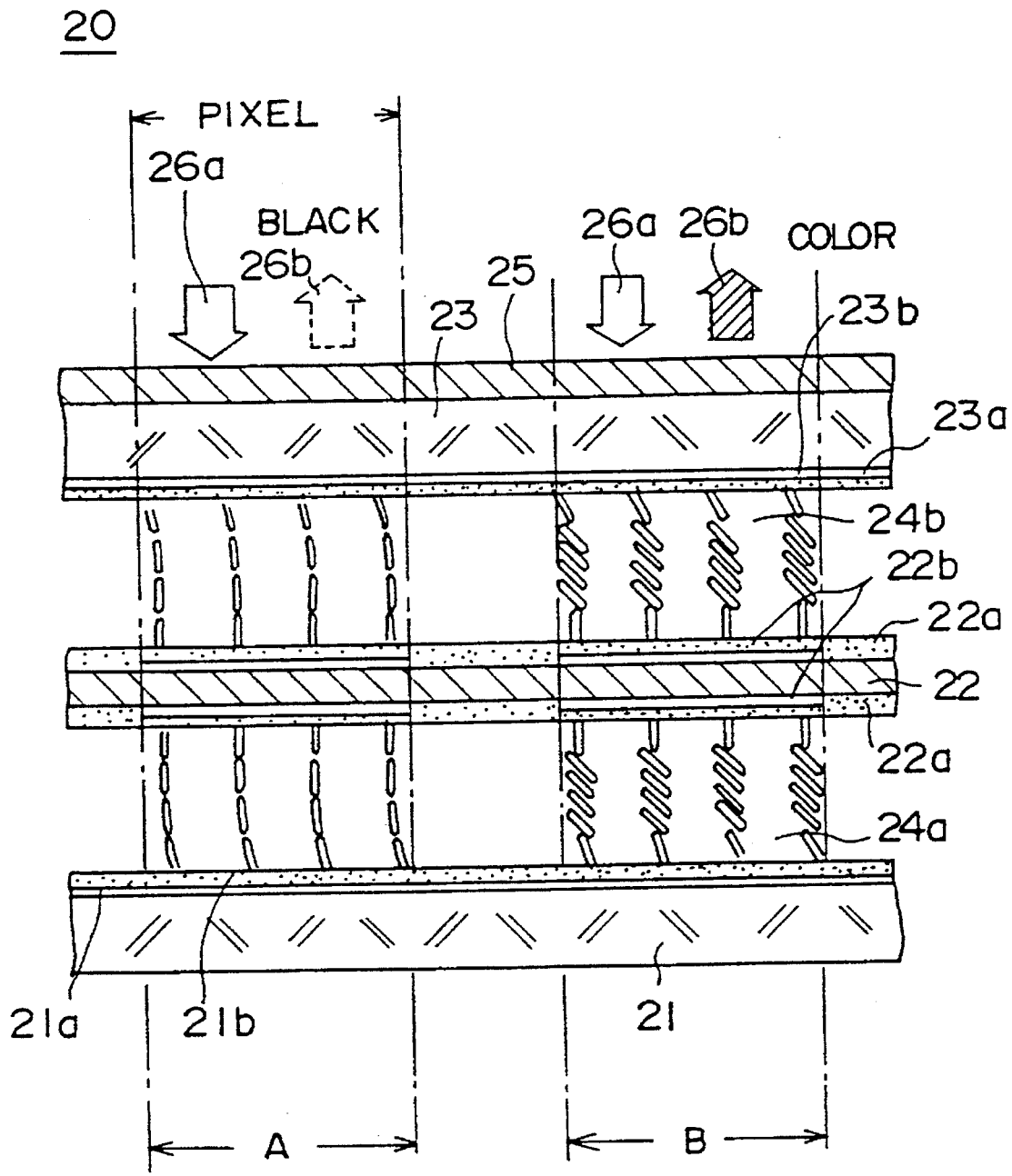
FIG. 3 is a diagram showing the construction of a conventional color liquid crystal display device that uses birefringence.
Figure 4:
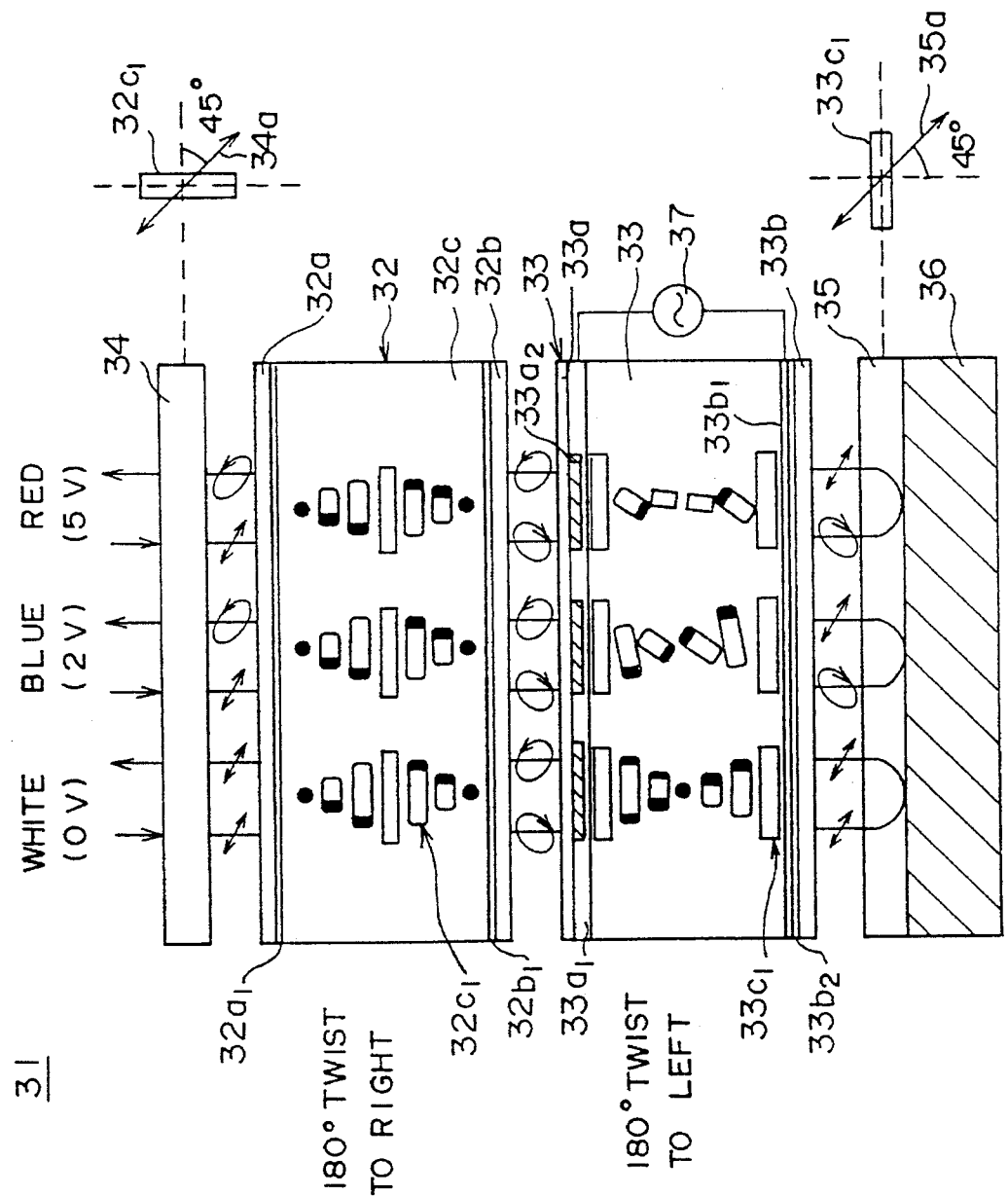
FIG. 4 is a diagram showing the construction of a color liquid crystal display device according to a first embodiment of the present invention.

FIG. 4 shows a color liquid crystal display device 31 according to a first embodiment of the present invention.

Referring to FIG. 4, the color liquid crystal display device 31 is a device of the SBE type for use in a reflection type display device and includes a first liquid crystal panel 32 acting as a compensation panel and a second liquid crystal panel 33 acting as a driver panel, wherein the panel 32 is stacked on the panel 33 to form a panel assembly. Further, an upper polarizer 34 is provided above the panel 32 and a lower polarizer 35 is provided below the panel 33. Further, there is provided a reflector 36 below the polarizer 35. The reflector 36 may be a reflective coating provided on the lower major surface of the polarizer 35.

The compensation panel 32 is formed of a pair of glass substrates 32a and 32b sandwiching a liquid crystal layer 32c therebetween, wherein the glass substrates 32a and 32b carry thereon respective molecular alignment layers $32a_1$ and $32b_2$ that provide together a twisting angle to the liquid crystal molecules in the layer 32c. It should be noted that the liquid crystal layer 32c incorporates therein a chiral material that determines the direction of twisting. In the illustrated example, the liquid crystal molecules are twisted in the right direction in the liquid crystal layer 32c.

The driver panel 33 is formed of a pair of glass substrates 33a and 33b sandwiching a liquid crystal layer 33c therebetween, wherein the glass substrate 33a carries an electrode pattern $33a_2$ and a molecular alignment film $33a_1$ such that the electrode pattern $33a_2$ is covered by the molecular alignment film $33a_1$, while the glass substrate 33b carries an electrode pattern $33b_2$ and a molecular alignment film $33b_1$ such that the electrode pattern $33b_2$ is covered by the molecular alignment film $33b_1$. The molecular alignment layers $33a_1$ and $33b_1$ provide a twisting angle to the liquid crystal molecules in the layer 33c such that the magnitude of the twisting angle in the layer 33c is identical with that of the layer 32c, except that the direction of the twist is opposite in the layer 32c and in the layer 33c. For this purpose, the liquid crystal layer 33c is admixed with a chiral material that provides a twist to the liquid crystal molecules in the layer 33c in the left direction.

In the illustrated example, the molecular alignment layers $32a_1$ and $32b_1$ are rubbed parallel in a first direction such that a 180 degree twist of liquid crystal molecules is obtained between the upper interface where the liquid crystal layer 32c contacts with the molecular alignment layer $32a_1$ and the lower interface where the liquid crystal layer 32c contacts with the molecular alignment layer $32b_1$. Similarly, the molecular alignment layers $33a_1$ and $33b_1$ are rubbed parallel in a second direction perpendicular to the aforementioned first direction such that a 180 degree twist of liquid crystal molecules is obtained between the upper interface where the liquid crystal layer 33c contacts with the molecular alignment layer $33a_1$ and the lower interface where the liquid crystal layer 33c contacts with the molecular alignment layer $33b_1$. It should be noted, however, that the twisting angle is not limited to 180 degrees, as will be explained later as long as the twisting angles have an identical magnitude and opposite directions.

Further, a driver circuit 37 is connected across the electrode patterns $33a_2$ and $33b_2$ of the driver panel 33, and the compensation panel 32 and the driver panel 33 are stacked as indicated in FIG. 4. Thus, a optical beam incident to the driver 33 from the above direction experiences a liner polarization by the polarizer 34 and enters the compensation panel 32. It should be noted that the plane of polarization of the polarizer 34 is set obliquely to the first direction in which the liquid crystal molecules at the interface between the liquid crystal layer 32c and the molecular alignment layer $32a_1$ are aligned. In the illustrated example, the angle is set to 45 degrees as indicated in the right drawing wherein the arrow 34a indicates the plane of polarization of the polarizer 34 while the numeral $32c_1$ indicates the molecule at the interface where the liquid crystal layer 32c and the molecular alignment layer $32a_1$ contact with each other. Thus, the optical beam entered to the liquid crystal layer 32c experiences a rotation of the polarization plane as it propagates toward the lower glass substrate 32b and exits from the panel 32 as a circularly polarized light.

The circularly polarized light thus obtained then enters to the driver panel 33 wherein the light thus entered experiences a negative retardation as well as a rotation of the polarization plane in the opposite direction. It should be noted that the direction of the liquid crystal molecules at the molecular alignment layer $33a_1$ as well as the direction of the liquid crystal molecules at the molecular alignment layer $33b_1$, are set in the second direction that is substantially perpendicular to the aforementioned first direction. Thus, the optical beam that exits from the driver panel 33 in the downward direction in the unbiased stake of the panel 33, recovers the original linear polarization, with the plane of polarization coincident to the second direction.

The optical beam thus exited from the driver panel 33 enters to the lower polarizer 35 having the plane of polarization in the second direction and is refiscted back to the driver panel 33 at the reflector 36. Thus, the optical beam experiences a negative retardation as well as a reversal rotation for the plane of polarization as it is propagated in the reverse, upward direction through the liquid crystal layer 33c and enters to the compensation panel 32. The compensation panel 32 provides an opposite, compensating retardation and rotation of the plane of polarization to the optical beam as it is propagated through the liquid crystal layer 32c and the optical beam exits from the panel 32 as a linearly polarized light with the plane of polarization coincident to the plane of polarization of the polarizer 34. In other words, one obtains a bright white in the unbiased state of the driver panel 33 with a maximum luminance.

When a bias is applied to the liquid crystal layer 33c, the liquid crystal molecules are aligned in the vertical direction as indicated in the central or right part of FIG. 4 with increasing drive voltage applied across the electrodes $33a_2$ and $33b_2$, and the light propagated through the liquid crystal panels 32 and 33 show coloring as a result of retardation. By controlling the voltage applied across the electrodes $33a_2$ and $33b_2$, it is possible to control the color as desired.

It should be noted that each of the compensation panel 32 and the driver panel 33 has the same thickness d that is set sufficiently large to obtain necessary retardation $_\Delta$n·d, which is in the order of 1000–3000 nm, preferably larger than 1600 nm, wherein the magnitude of birefringence Δn is usually between 0.05 and 0.2. In correspondence to this, the panels 32 and 33 of the present invention has a thickness of about 10–30 μm.

In the liquid crystal display device 31 of FIG. 4, the plane of polarization is set generally in the same direction in the polarizer 34 and in the polarizer 35 as already mentioned. Although it is not necessary to set the directions of polarization planes to coincide exactly, it is preferable to set the difference within 10 degrees. Further, it should be noted that the twist angle is not limited to 180 degrees but may be changed variously under the constraint that the magnitude of the twist angle is identical between the panel 32 and the panel 33.

Figure 5A:
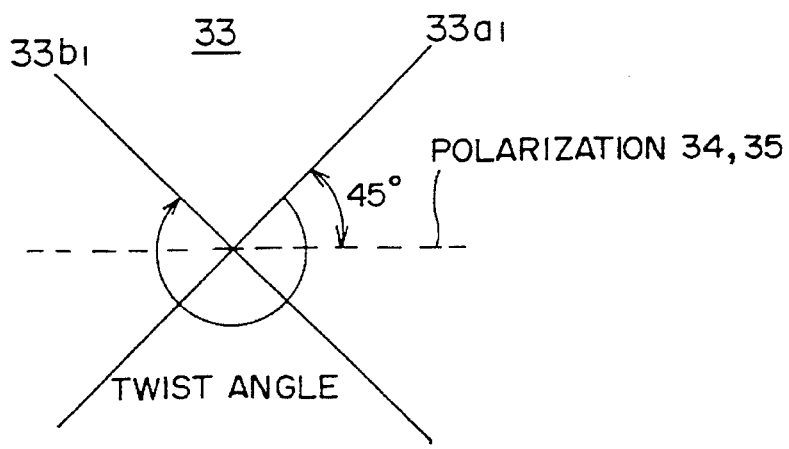
FIGS. 5A–5C are diagrams showing the rubbing of the molecular alignment layer used in the device of FIG. 4.
Figure 5B:
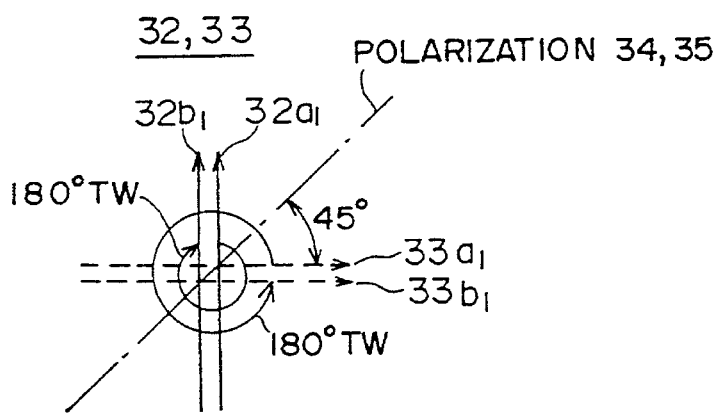

FIGS. 5A and 5B show examples of the setting of the rubbing direction and the plane of polarization of the polarizers.

FIG. 5A shows a case wherein the rubbing direction of the molecular alignment layer $33a_1$ on the upper substrate 33a and rubbing direction of the molecular alignment layer $33b_1$ on the lower substrate 33b are set to cross with each other in the driver panel 31. For the sake of simplicity, the rubbing directions of the compensation panel 32 are not represented. In this case, the twist angle is larger than 180 degrees for the liquid crystal molecules $33c_1$ ae indicated. Further, the polarizers 34 and 35 are disposed such that the plane of the polarization forms an angle of 45±5 degrees with respect to the rubbing directions.

Figure 5C:
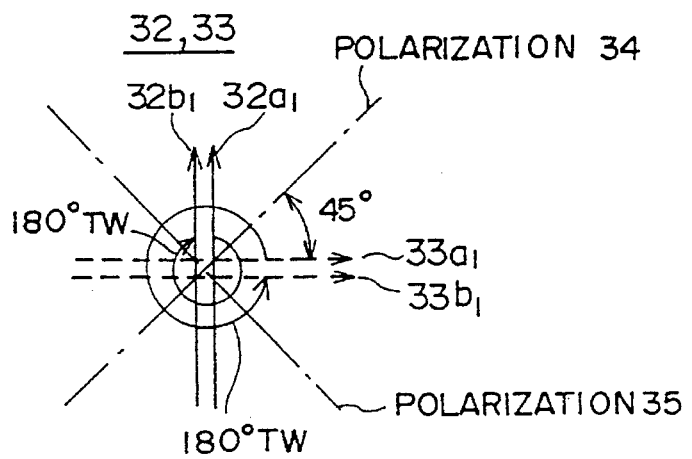

FIG. 5B shows a case corresponding to FIG. 4 wherein it will be noted that the rubbing direction of the substrates 32a and 32b are set in the same direction corresponding to the foregoing first direction as indicated by the continuous lines, while the rubbing direction of the substrates 33a and 33b are set in the same direction corresponding to the foregoing second direction as indicated by the broken lines. Further, the polarizers 34 and 35 are disposed such that the plane of polarization forms an angle of 45 degrees with respect to the rubbing directions of the panels 32 and 33. It should be noted that one obtains bright white by setting the plane of polarization of the polarizer 34 to be identical to the plane of polarization of the polarizer In the device 31 of FIG. 4, it is possible to obtain a clear, pure black by setting the plane of polarization of the polarizer 34 and the plane of polarization of the polarizer 35 to cross with each other as indicated in FIG. 5C. In this case, the optical beam incident to the display panel 31 is cut off completely by the polarizer 35 as long as the driver panel 33 is in the unbiased state.

Figure 6A:
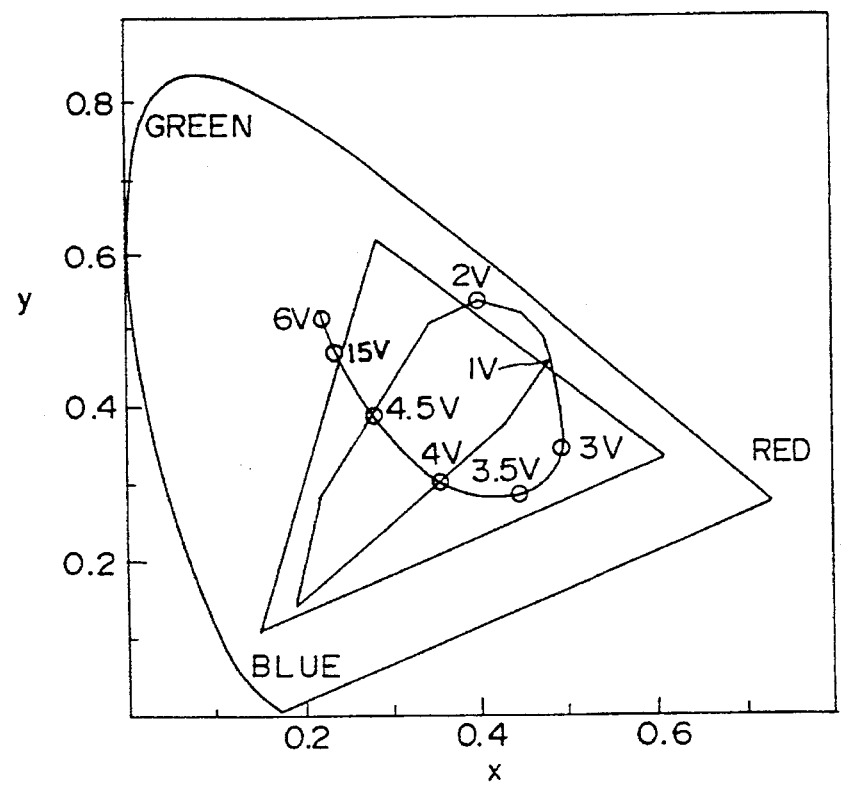
FIGS. 6A and 6B are diagrams showing the performance of color liquid crystal display of FIG. 4.
Figure 6B:
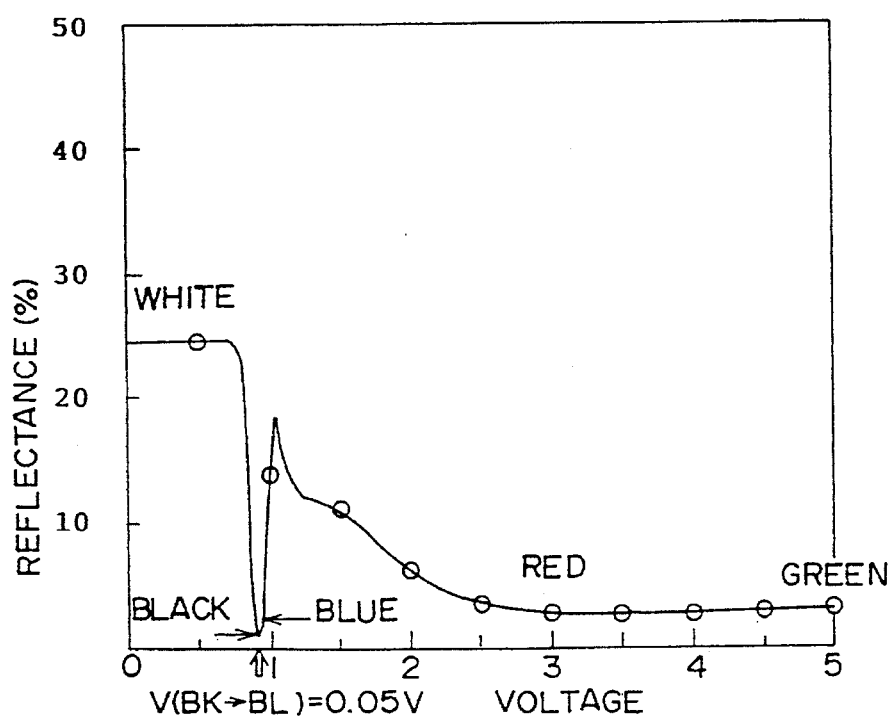

FIGS. 6A and 6B respectively show the change of color and reflectance of the color liquid crystal display device of FIG. 4 with increasing drive voltage. Referring to FIG. 6A showing the color in the CIE (Commission Internationals de l'Eclairage) representation system, it will be noted that the color changes along the line with increasing voltage, wherein the numerals attached to each measuring point indicates the drive voltage applied to the driver panel 33. In FIG. 6B showing the reflectance, it will be noted that bright white is obtained with a reflectance reaching as much as 25% without applying a drive voltage. Further, it will be noted that clear, almost pure black is obtained at the drive voltage slightly smaller than 1 volt. Further, there exists a voltage margin of about 0.05 volts for the transition from black to blue, while this value is sufficiently large for controlling the color transition from black to blue by electrical means.

Figure 7A:
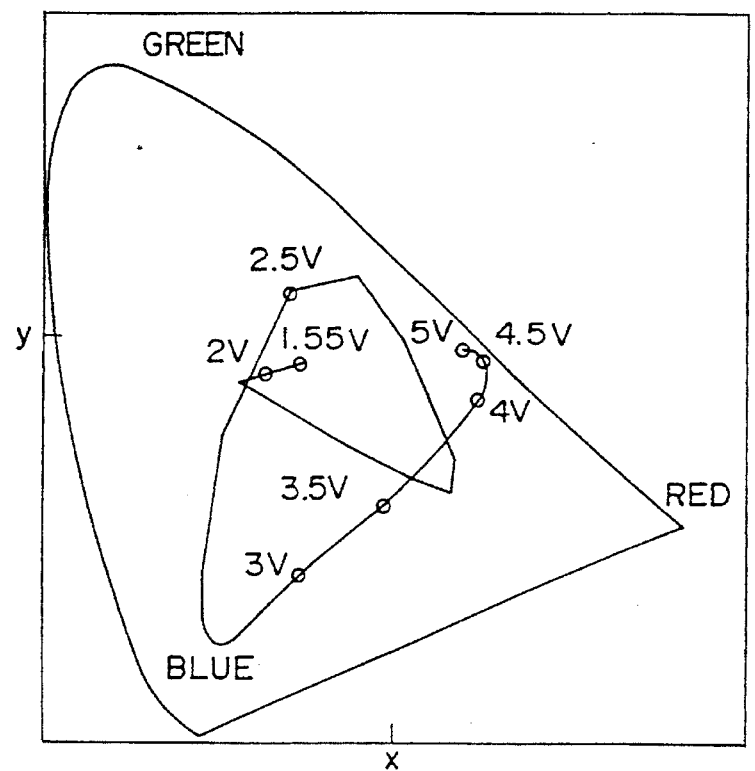
FIGS. 7A and 7B are diagrams showing the performance of a color liquid crystal display that lacks the compensation panel.
Figure 7B:
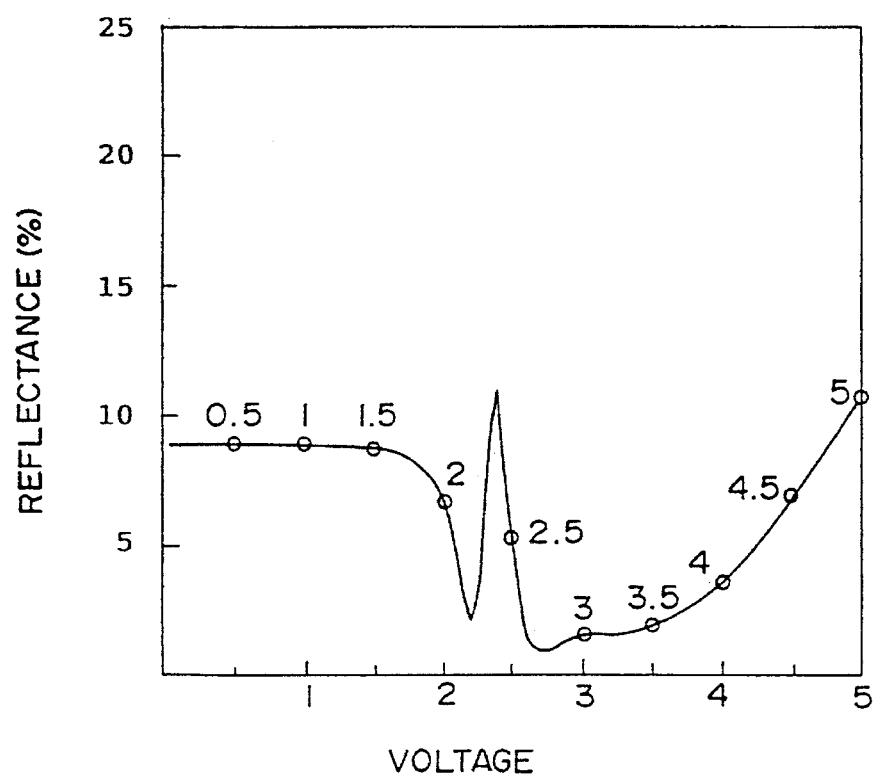

FIGS. 7A and 7B are diagram similar to FIGS. 6A and 6B except that the compensation panel 32 is removed from the liquid crystal device 31 of FIG.4.

In this case, while the color change occurs along the line in FIG. 7A similarly to FIG. 6A, the unbiased state of the driver panel 33 results in a coloring of the reflected light due to the absence of the compensation panel 32. As indicated in FIG. 7B, it is necessary to apply a drive voltage higher than 5 volts to obtain the desired bright white color, while use of such a high drive voltage is not preferable in the compact, portable computers.

The following TABLE I shows the result of a reflectance measurement conducted for the color liquid crystal display device of FIG. 4.

TABLE I

| CROSSED POLARIZERS | WHITE | 12.36% |
|---|---|---|
|  | BLACK | 0.38% |
|  | RED | 7.99% |
|  | GREEN | 9.12% |
|  | BLUE | 2.87% |
| PARALLEL POLARIZERS | WHITE | 31.27% |
|  | BLACK | 1.74% |
|  | RED | 10.00% |
|  | GREEN | 10.21% |
|  | BLUE | 4.69% |

From TABLE I, it will be noted that a very clear, pure black representation is obtained when the crossed polarizers are used as indicated in FIG. 5C in the device of FIG. 5, while a bright white representation is obtained by using the parallel polarizers. In the measurement shown in TABLE I conducted for the parallel polarizers, it will be noted that a reflectance as much as b 31.27% was observed for the white representation, together with a reflectance of 1.74% for the black representation. Thus, it is possible to obtain clear bright white and clear pure black by using the liquid crystal device of FIG. 4. In the device of FIG. 4, various magnitude of the twist of the liquid crystal molecules can be used for the liquid crystal panels 32 and 33 as described in relation to FIGS. 5A and 5B, as long as the magnitude is identical in the panel 32 and panel 33 and the direction of twist is opposite in the panel 32 and panel 33. In relation to this, it should be noted that there exists a tendency that the angle of visual field increases with increasing twist angle. Further, the transition voltage $_AV$ for causing the transition from black to blue ae indicated in FIG. 6B tends to decrease with increasing twist angle. Larger the transition voltage $_{42}$ V, easier to control the color transition from black to blue. The preferred twist angle of 180 degrees is obtained as a result of tradeoff between these two mutually opposing tendencies.

Next, a second embodiment of the present invention will be described.

Figure 8A:
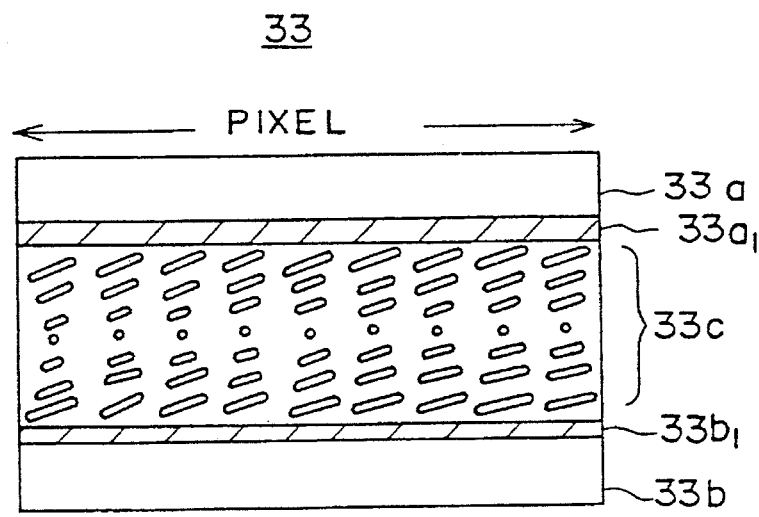
FIGS. 8A and 8B are cross sectional diagram showing the molecular alignment in the liquid crystal display device of FIG. 4.
Figure 8B:
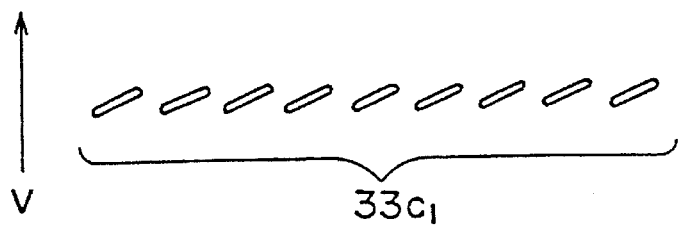

In the liquid crystal display device of the first embodiment shown in FIG. 4 wherein the rubbing is made in the same direction in the molecular alignment layers $32a_1$ and $32b_1$ or in the molecular alignment layers $33a_1$ and $33b_1$, it should be noted that the liquid crystal molecules are aligned in the same direction in each of the pixels as indicated in FIGS. 8A and 8B, wherein FIG. 8B shows the liquid crystal molecules $33c_1$ at the central level of the liquid crystal layer $33c$. In such a case, there occurs a problem in that the color of the display device looks different when viewed from the elongating direction of the liquid crystal molecules and from the direction perpendicular to the foregoing elongating direction.

Figure 9:
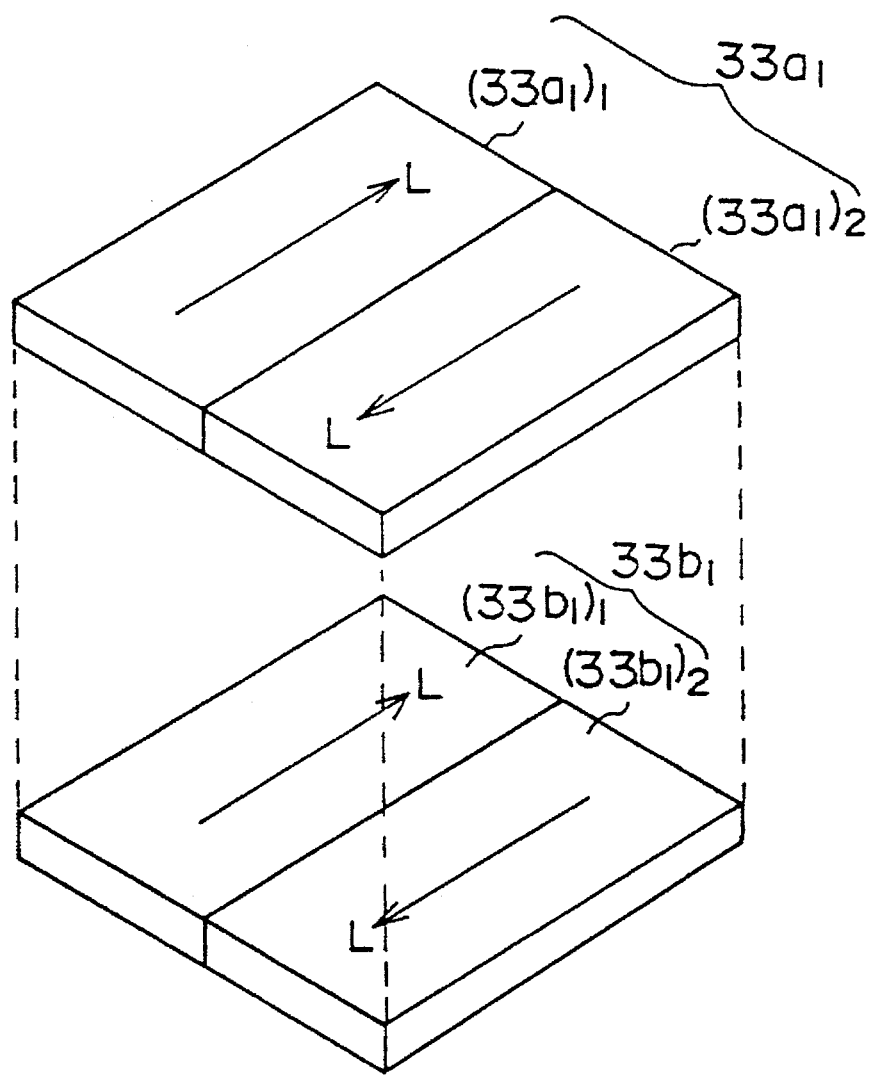
FIG. 9 is a diagram showing a second embodiment of the present invention.

In order to remedy this problem, the present embodiment employs two, mutually opposite rubbing directions in each of the pixels as indicated in FIG. 9.

Referring to FIG. 9 showing the essential feature of the present invention, the molecular alignment layer $33a_1$ or $33b_1$ in the driver panel 33 is divided into a first region such as $(33a_1)_1$ or $(33b_1)_1$ and a second region such as $(33a_1)_2$ or $(33b_1)_2$ in each of the pixels, such that the rubbing direction of the region $(33a_1)_1$ is opposite to the rubbing direction of the region $(33a_1)_2$ and such that the rubbing direction of the region $(33b_1)_1$ is opposite to the rubbing direction of the region $(33a_1)_2$. In FIG. 9, it should be noted further that the regions $(33a_1)_1$ and $(33b_1)_1$ facing each other across the liquid crystal layer have the same rubbing direction in a direction L, and the regions $(33a_1)_2$ and $(33b_1)_2$ have the same rubbing direction in a direction –L.

Figure 10A:
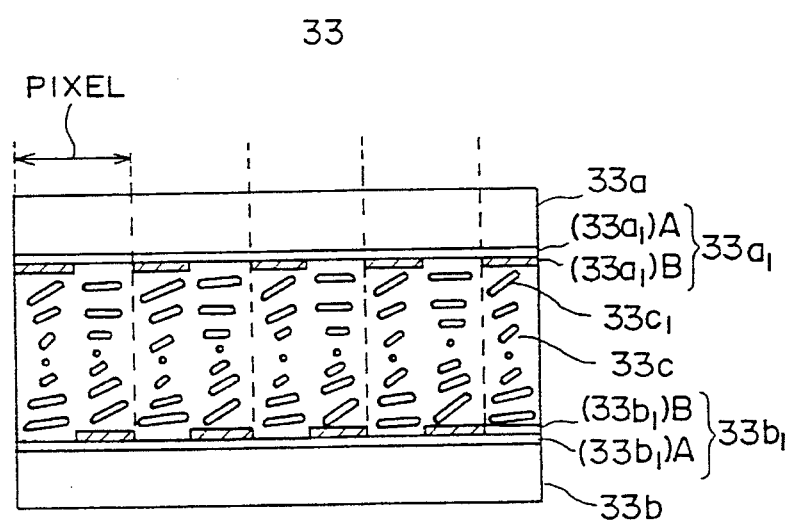
FIGS. 10A and 10B are diagrams showing the construction of the liquid crystal display device of the second embodiment and the molecular alignment realized therein.
Figure 10B:
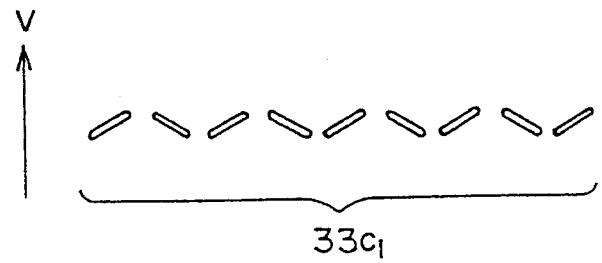

FIGS.10A and 10B show the second embodiment of the present invention applied to the driver panel 33. For the sake of simplicity, the electrode patterns $33a_2$ and $33b_2$ are omitted from illustration. In the present embodiment, too, it should be noted that the direction of twist of the liquid crystal molecules is opposite in the panel 32 and in the panel 33 while the magnitude of the twist is identical in the panel 32 and in the panel 33.

Referring to FIG. 10A showing the cross section of the panel 33, it will be noted that the upper molecular alignment layer $33a_1$ is formed of a molecular alignment layer $(33a_1)_1$ A rubbed in the direction L and a molecular alignment pattern $(33_1)$B provided on the layer $(33a_1)$A with the rubbing direction –L. Similarly, the lower molecular alignment layer $33b_1$ is formed of a molecular alignment layer $(33b_1)$A rubbed in the direction –L and the upper molecular alignment pattern $(33b_1)$B provided on the layer $(33b_1)$A with the rubbing direction L. Preferably, the molecular alignment layers $(33a_1)$A and $(33a_1)$B are formed of an inorganic material providing a low pretilt angle, while the molecular alignment patterns $(33a_1)$B and $(33b_1)$B are formed of an organic material such as polyimide that provides a high pretilt angle.

Figure 11A:
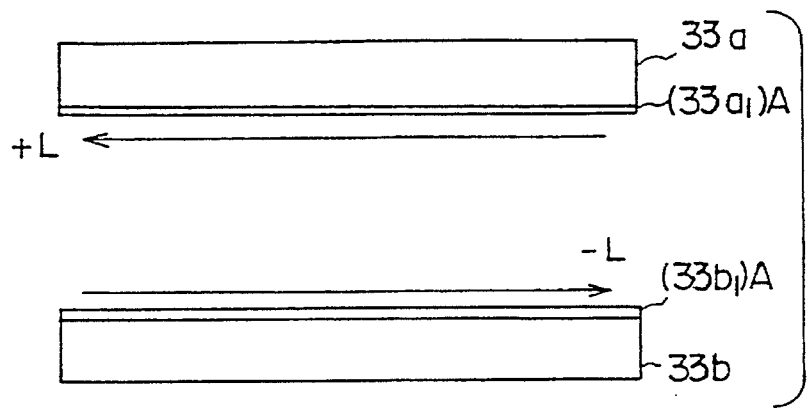
FIGS. 11A–11C are diagrams showing the process for assembling the liquid crystal display device of the second embodiment.
Figure 11B:
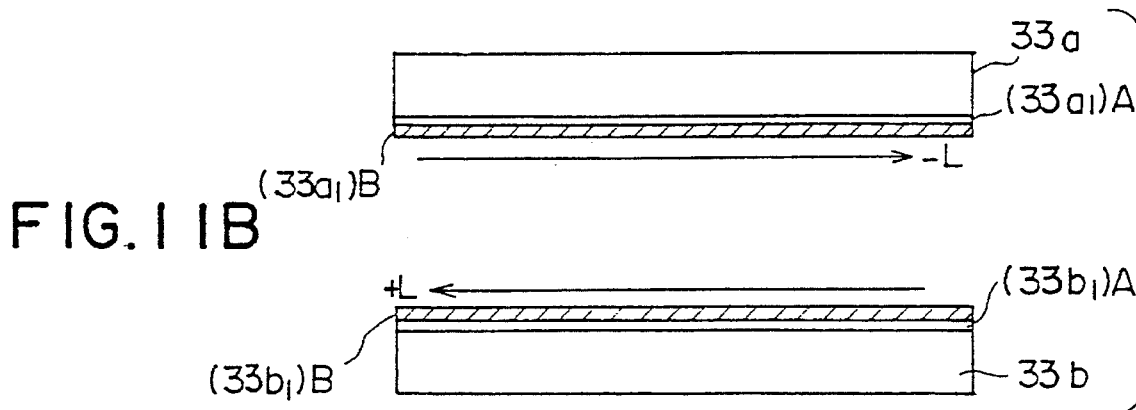

FIG. 10B shows the liquid crystal molecules $33c_1$ at the intermediate level of the liquid crystal layer $33c$. As can be seen in FIG. 10B, the tilt angle of the liquid crystal molecules changes alternately and the problem of the liquid crystal panel showing different color depending upon the view angle is substantially reduced. More specifically, the color that the liquid crystal molecules show in the elongate direction is compensated or averaged by the color represented in the direction perpendicular to the liquid crystal molecules, and the color change depending on the view angle is minimized. FIGS. 11A and 11B the process for forming the driver panel 33.

Referring to FIG. 11A, an inorganic molecular alignment layer is deposited on the substrates $33a$ and $33b$ to form the molecular alignment layers $(33a_1)$A and $(33a_1)$A with a thickness of 800–1000 Å. Further, the layer $(33b_1)$A is subjected to a rubbing process in the direction L, while the layer $(33b_1)$A is subjected to a rubbing process in the direction –L.

Next, polyimide layers are deposited respectively on the layer $(33a_1)$A and the layer $(33b_1)$A to form the molecular alignment layers $(33a_1)$B and $(33b_1)$B as indicated in FIG. 11B with a thickness of 800–1000 Å. Further, the layer $(33a_1)$B is rubbed in the –L direction and the layer $(33b_1)$B is rubbed in the +L direction.

In the process of FIGS. 11A and 11B, the processing of the substrates $33a$ and $33b$ is achieved independently.

Figure 11C:
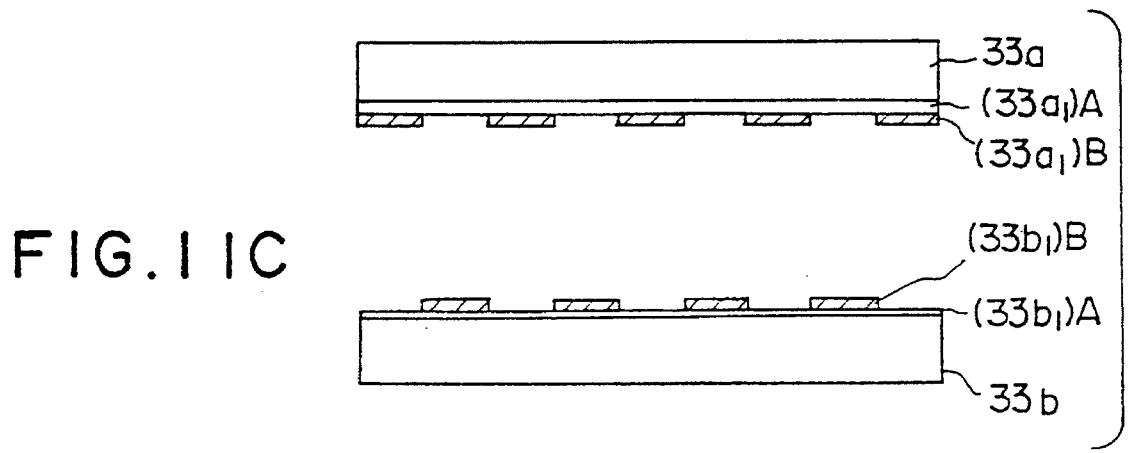

Further, the layers $(33a_1)$B and $(33b_1)$B are patterned as indicated in FIG. 11c and the substrates $33a$ and $33b$ thus carrying the molecular alignment layers thereon are assembled to face with each other. By filling the liquid crystal in the space between the substrate $33a$ and the substrate $33b$, the liquid crystal panel 33 is formed.

Figure 12A:
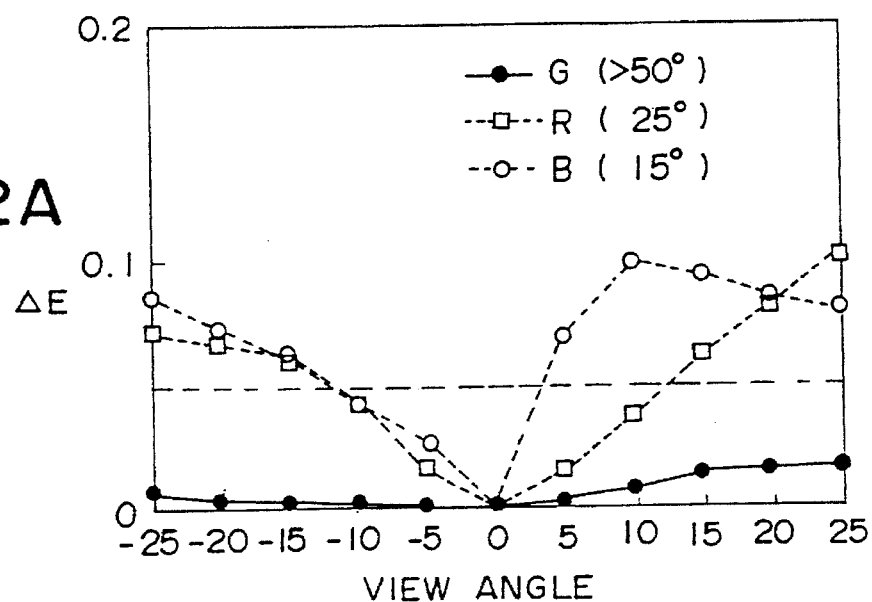
FIGS. 12A and 12B are diagrams showing the performance of the liquid crystal display device of the first embodiment and the second embodiment.
Figure 12B:
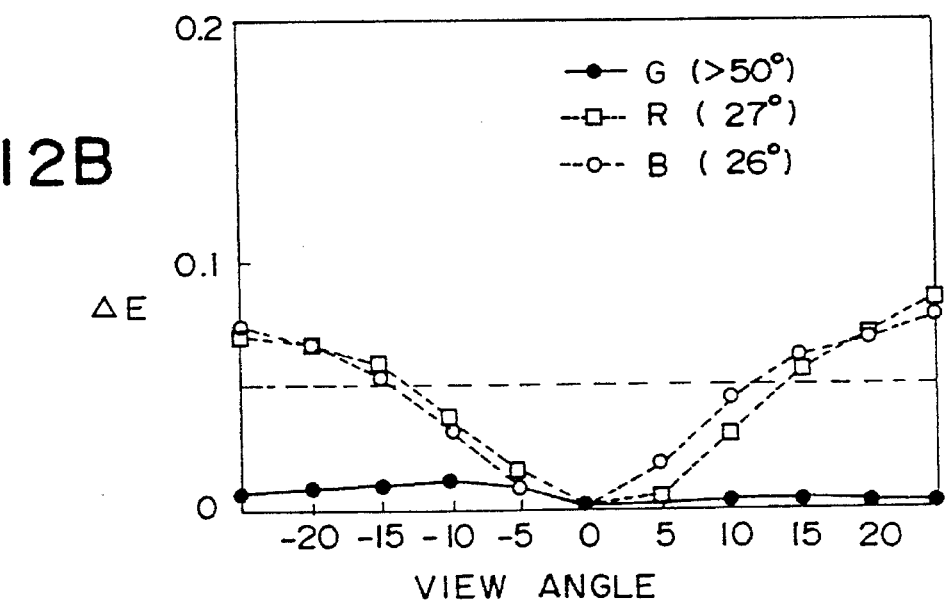

FIGS. 12A and 12B show the color change of the liquid crystal display panel as a function of the view angle for the liquid crystal display device of FIG. 4, for the case where the division of the pixels shown in FIG. 9 is not employed (FIG. 12A) and for the case such a division is employed (FIG. 12B), wherein the vertical axis of FIGS. 12A and 12B represents the color difference $_\Delta E$. In the experiment of FIGS. 12A and 12B, it should be noted that the division of the pixels is achieved in the lateral direction of the panel, and the view angle at the horizontal axis represents the view angle offset measured in the lateral direction from the perpendicular direction of the panel.

As will be seen in FIG. 12A, there is a substantial color variation particularly in blue and red, while the color variation is substantially suppressed in FIG. 12B, indicating the effectiveness of the construction of FIG. 9 for dividing the pixels.

Figure 13A:
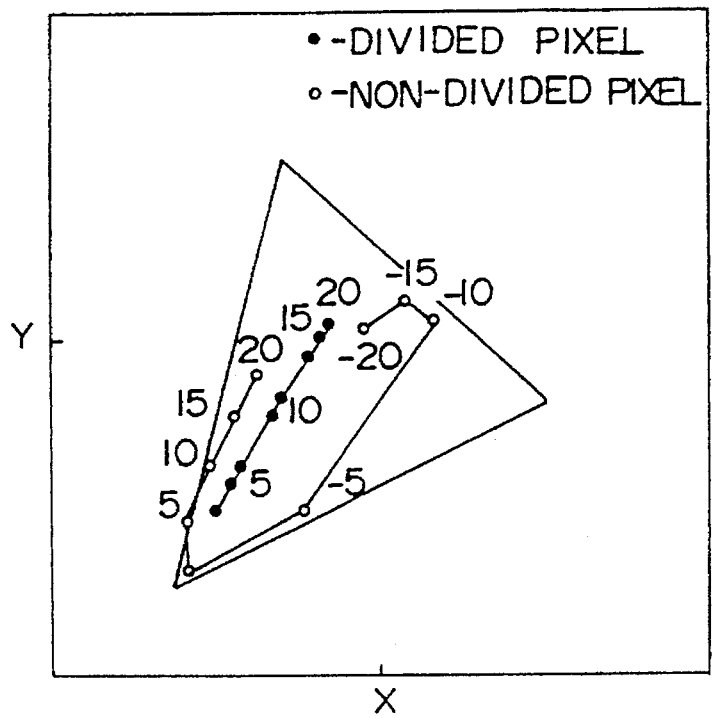
FIGS. 13A and 13B are diagrams showing the color change of the liquid crystal display device of the first embodiment and the second embodiment.
Figure 13B:
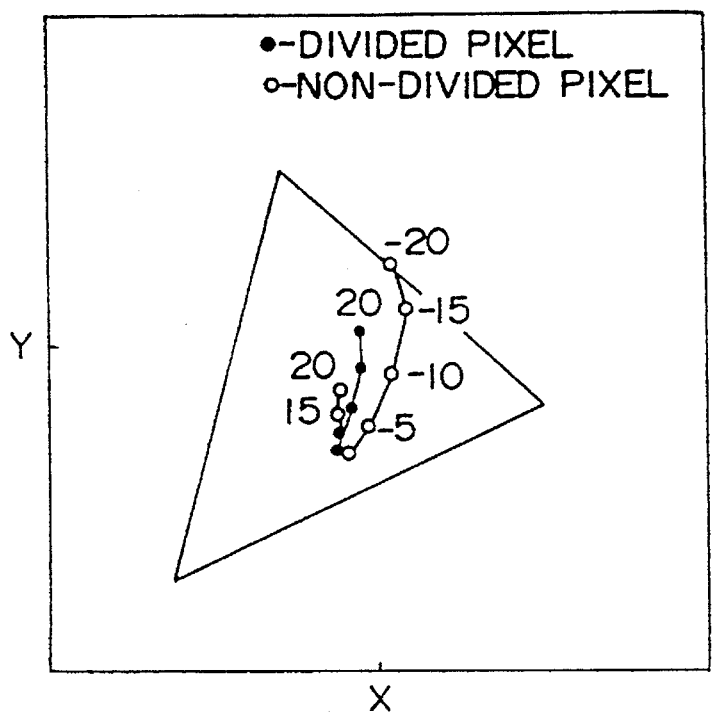

FIGS. 13A and 13B show the change of the color with the view angle corresponding to FIGS. 12A and 12B, wherein FIG. 13A shows the change of blue while FIG. 13B shows the change of red. In FIG. 13A and 13B, it should be noted that the solid circles correspond to FIG. 12B and represent the result for the liquid crystal display device wherein the division of the pixels shown in FIG. 9 is employed, while the open circles correspond to FIG. 12A wherein the division of the pixels is not employed. In FIGS. 13A and 13B, the numerals attached to each point represents the offset of the view angle. As will be clearly seen from FIG. 13A or 13B, an extensive and complex change of color occurs both in blue and red when the construction of FIG. 9 is not employed, while the extent of color change is reduced substantially as a result of use of the construction of FIG. 9.

Figure 14:
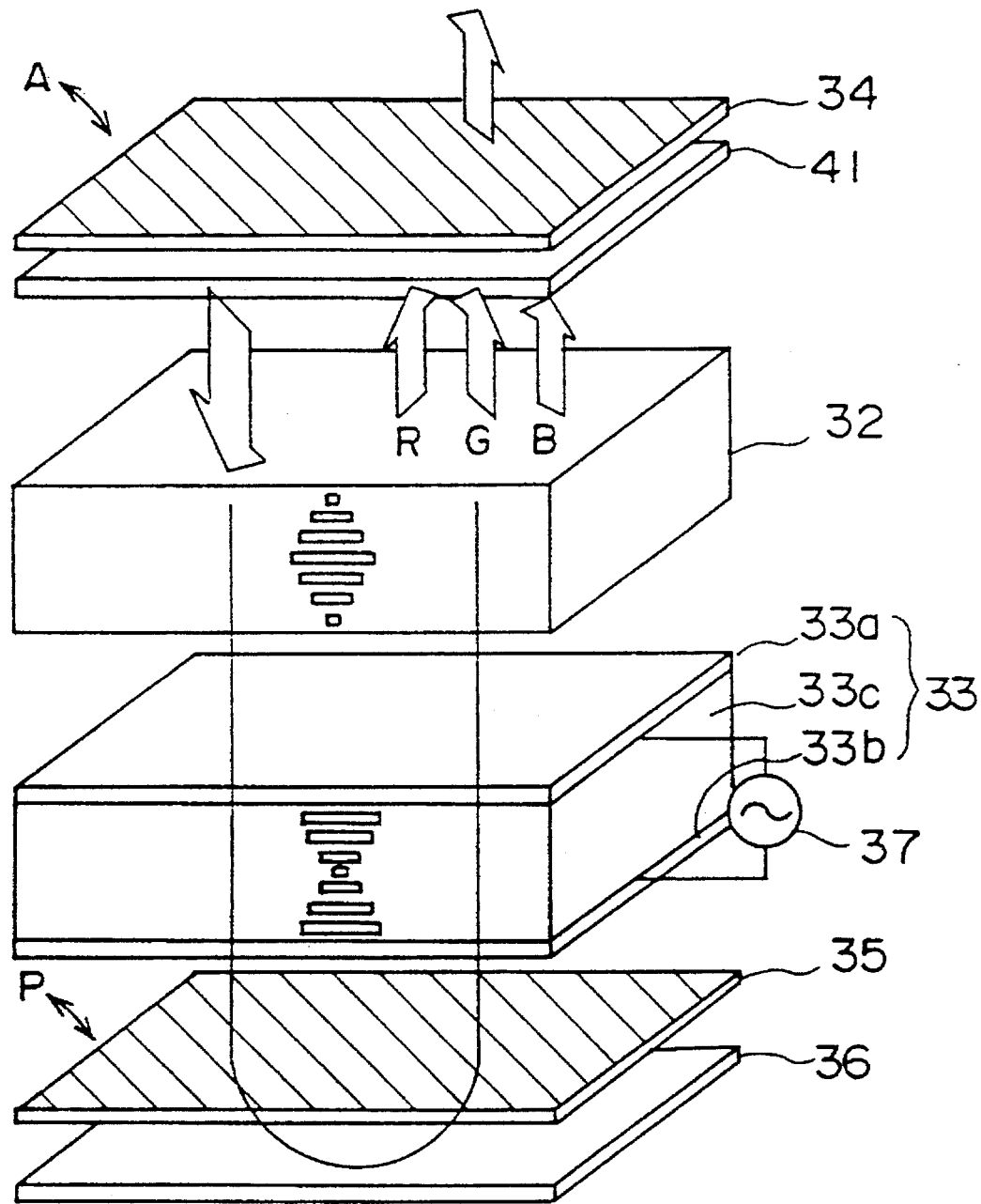
FIG. 14 is a diagram showing a third embodiment of the present invention.

FIG. 14 shows a third embodiment of the present invention.

Referring to FIG. 14, it will be noted that there is provided a retardation film 41 between the polarizer 34 and the compensation panel 32, wherein the retardation film 41 shows a uniaxial birefringence, with the optical axis perpendicular to the plane of the film 41.

FIGS. 15A–15C are diagrams showing the index ellipsoid of the retardation film 41.

Referring to FIG. 15A showing the index ellipsoid viewed from the z direction which is coincident to the optical axis, the refractive indices $n_x$ and $n_y$ in the x and y directions are equal ($n_x 32 \; n_y > n_z$), and the index ellipsoid appears like a circle and no retardation occurs. It should be noted that the z direction is the direction perpendicular to the plane of the film 41, while the x and y directions are form the plane of the film 41.

When viewed from an angle e from the z direction as indicated in FIG. 15B, on the other hand, the retardation film 41 shows birefringence and a retardation color appears when the light passed through the retardation film 41 exits from the polarizer 34. In other words, the retardation color obtained by the retardation film 41 changes upon the view angle.

Thus, by using the retardation film 41 in combination with the liquid crystal display device 31 of FIG. 4, it is possible to compensate further for the change of color of the display panel shown in FIG. 12B. For example, in order to compensate for the color change of the display panel for the view angle of 30 degrees with respect to the perpendicular direction of the panel, it is necessary that the retardation $_\Delta n' \cdot d$ of the retardation film 41 should satisfy the condition $$\tfrac{1}{60} \cdot {}_\Delta n(L) \cdot d \approx {}_\Delta n' \cdot d \approx \tfrac{1}{30} \cdot {}_\Delta n(L) \cdot d,$$

wherein the birefringence $_\Delta n'$ is defined as $_\Delta n' = n_x' - n_y'$ and the term $_\Delta n \cdot d$ represents the retardation of the liquid crystal panel. Assuming that $_\Delta n(L) \cdot d \approx 1800$ nm, the retardation $_\Delta n' \cdot d$ should be in the range between 30 nm and 60 nm (30 nm $\leq {}_\Delta n' \cdot d \leq$ 60 nm).

Figure 16A:
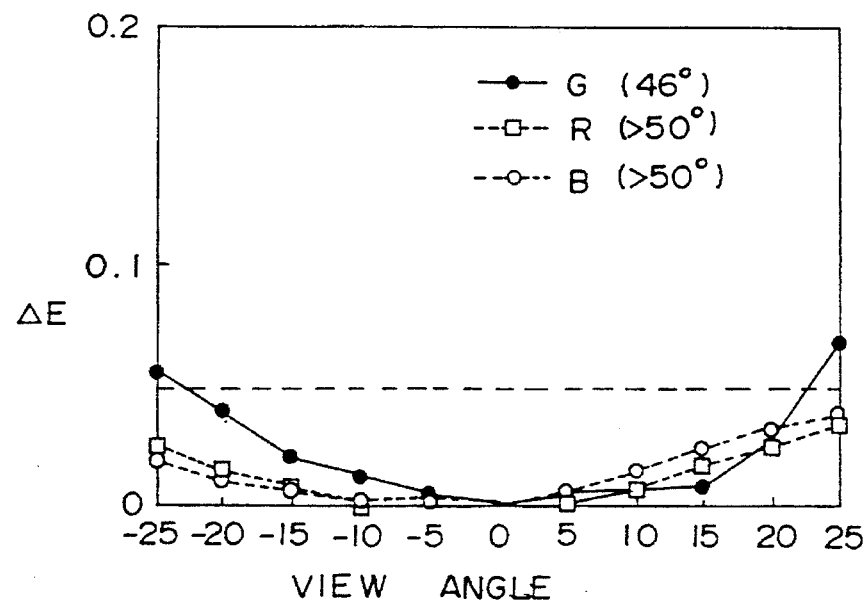
FIGS. 16A and 16B show the performance of the liquid crystal display device of the third embodiment in comparison with the first or second embodiment of the present invention.
Figure 16B:
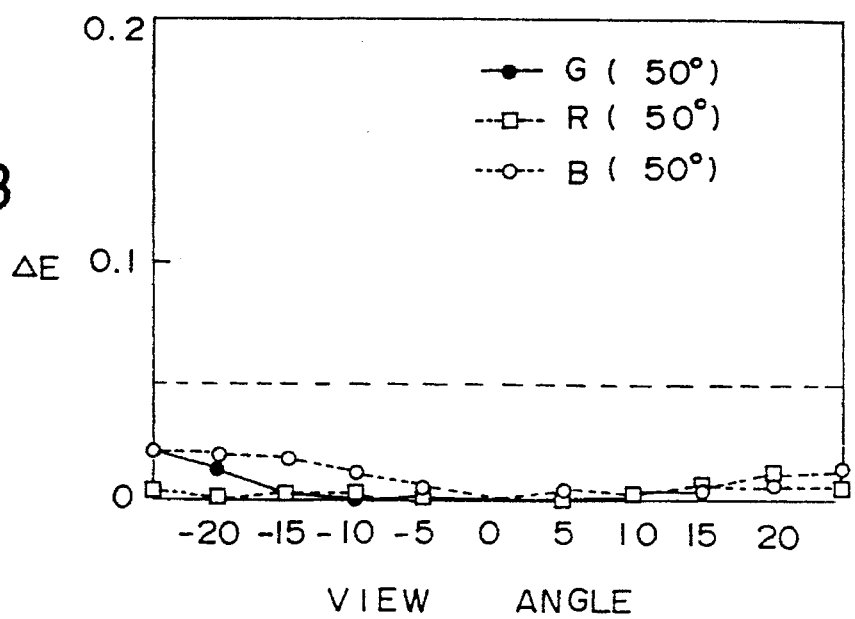

FIGS. 16A and 16B show the effect of color change of the liquid crystal display panel as a change of view angle in the vertical direction of the panel, wherein FIG. 16A shows the case where no retardation film 41 is used. On the other hand, FIG. 16B shows the case wherein the retardation film 41 is used. It will be noted that the color change with the view angle is substantially suppressed as a result of use of the retardation film 41.

Figure 17:
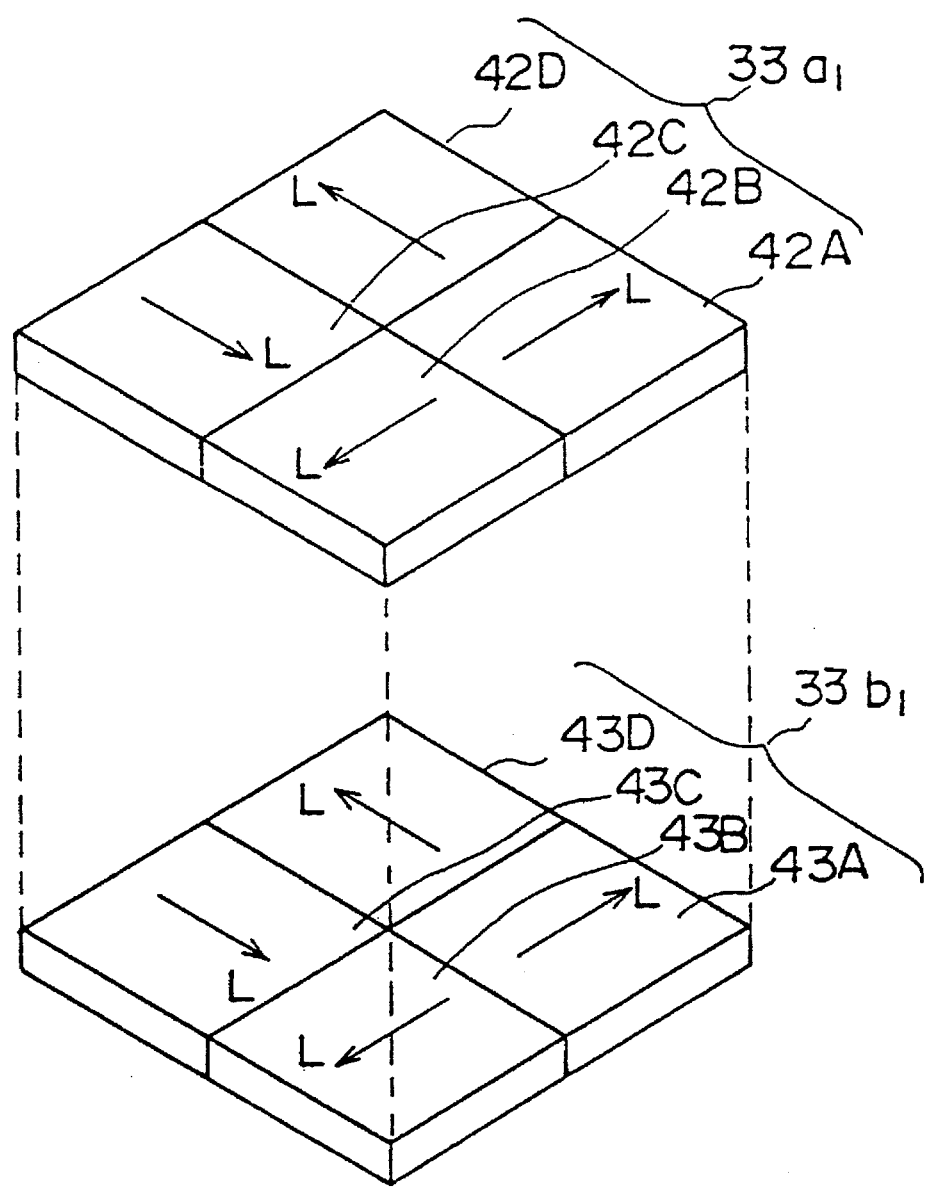
FIG. 17 is a diagram showing a modification of the second embodiment.
Figure 18:
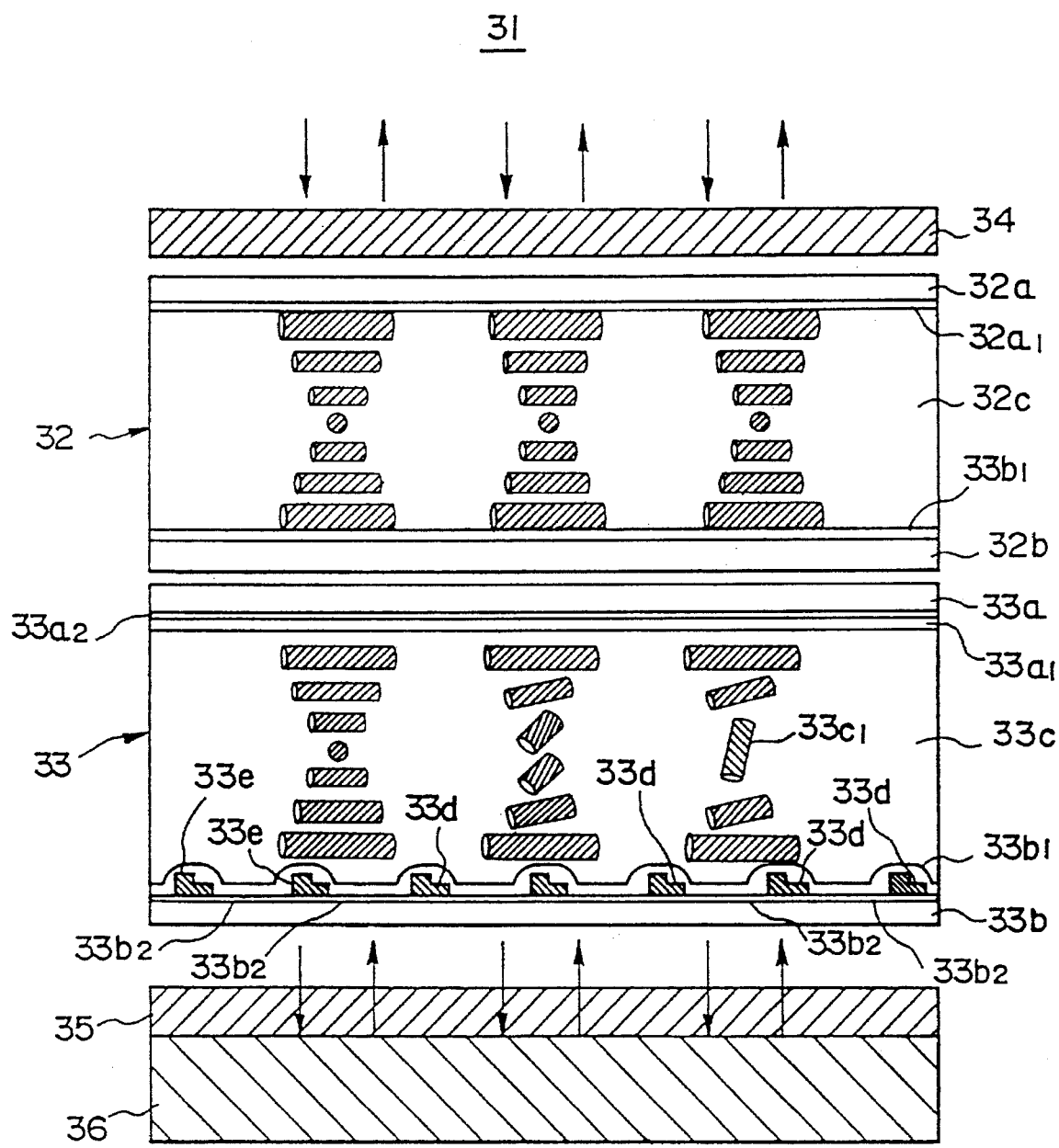
FIG. 18 is a diagram showing the construction of the liquid crystal display device in which thin-film transistors are arranged to form an active matrix system.

FIG. 17 shows a modification of the second embodiment, wherein the molecular alignment film $32a_1$ and $32b_1$ include a number of regions having respective rubbing directions in each of the pixels. More particularly, the molecular alignment film $32a_1$ includes, in each of the pixels, regions 42A–42D wherein the regions 42A and 42B are rubbed in mutually opposing directions while the regions 42C and 42D are rubbed in mutually opposing directions that are perpendicular to the rubbing directions of the regions 42A and 42B. Similarly, the regions 43A and 43B are rubbed in mutually opposing directions while the regions 43c and 43D are rubbed in mutually opposing directions that are perpendicular to the rubbing directions of the regions 43A and 43B. It should be noted that the regions 42A and 43A are disposed to oppose with each other across the liquid crystal layer and have the same rubbing direction. Similarly, the regions 42B and 43B are disposed to oppose with each other with the same rubbing direction, the regions 42C and 43C are disposed to oppose with each other with the same rubbing direction, and the regions 42D and 43D are disposed to oppose with each other with the same rubbing direction. By dividing the molecular alignment layers $32a_1$ and $32b_1$, as well as the molecular alignment layers $33a_1$ and $33b_1$ for the driver panel 33 as such, it is possible to reduce the color change due to the view angle further. The structure of the molecular alignment layers shown in FIG. 17 may be obtained by masking the molecular alignment layer by a photoresist and applying a rubbing process selectively to each of the regions 42A–42D or 43A–43D. In the ECB liquid crystal display devices that produces color as a function of the electric field applied to the liquid crystal layer, it is essential to supply a well regulated voltage to the electrodes $33a_2$ and $33b_2$ of the driver panel 33. For this purpose, the liquid crystal display device 31 of FIG. 4 employs the active matrix driving system wherein a number of thin-film transistors (TFTs) $33d$ are provided in correspondence to the pixels as indicated in FIG. 18. In FIG. 18, it should be noted that the electrode $33b_2$ is divided into a number of segments or pixel electrodes corresponding to the pixels, and the TFTs $33d$, driven via a bus $33e$, energizes a corresponding pixel electrode $33b_2$. On the other hand, the electrode $33a_2$ forms a common electrode as usual in the active matrix system.

Further, the present invention is not limited to the embodiments described heretofore, but various variations and modifications may be made without departing from the scope of the invention.

What is claimed is:

1. A color liquid crystal display device, comprising:

a first liquid crystal panel having upper and lower major surfaces for accommodating liquid crystal molecules, said first liquid crystal panel having a first thickness and a first predetermined twist angle of liquid crystal molecules in a first direction;

a second liquid crystal panel having upper and lower major surfaces for accommodating liquid crystal molecules, said second liquid crystal panel having a second thickness identical to said first thickness and a second predetermined twist angle of liquid crystal molecules in a second, opposite direction such that said second predetermined twist angle is identical with said first predetermined twist angle in terms of magnitude;

one of said first and second liquid crystal panels carrying electrode means for applying an electric field to said liquid crystal molecules therein;

said first and second liquid crystal panels being stacked such that said first liquid crystal panel is provided on said second liquid crystal panel to form a liquid crystal panel assembly;

a first polarizer provided on said first liquid crystal panel with a first polarization plane; and a second polarizer provided on said second liquid crystal panel with a second polarization plane;

said first and second polarizers being disposed to form one of a first state wherein said first and second polarization planes are parallel with each other and a second state wherein said first and second polarization planes intersect with each other perpendicularly;

said first and second thicknesses being set such that a retardation larger than 1600 nm is obtained in each of said first and second liquid crystal panels.

2. A color liquid crystal display device as claimed in claim 1, wherein said first and second predetermined twist angles have a common absolute magnitude of 180 degrees.

3. A color liquid crystal display device as claimed in claim 2, wherein each of said first liquid crystal panel and second liquid crystal panel has an upper alignment layer and a lower alignment layer sandwiching therebetween a liquid crystal layer, for aligning liquid crystal molecules contacting thereto, said upper and lower alignment layer forming said first liquid crystal panel causing an alignment of said liquid crystal molecules that contact thereto in a first orientation, each of said upper and lower alignment,layers forming said second liquid crystal panel causing an alignment of said liquid crystal molecules that contact thereto in a second orientation that is substantially perpendicular to said first orientation.

4. A color liquid crystal display device as claimed in claim 3, wherein said first and second polarizers are,disposed such that said first and second polarization planes are parallel to each other, said polarization planes having a third orientation that generally bisects an angle formed between said first and second orientations.

5. A color liquid crystal display device as claimed in claim 4, wherein said third orientation forms an angle of substantially 45 degrees with respect to an elongating direction of said liquid crystal molecules.

6. A color liquid crystal display device as claimed in claim 4, wherein said first and second polarizers are disposed such that said first and second polarization planes intersect with each other perpendicularly, wherein each of said polarization planes bisects an angle formed between said first and second orientations.

7. A color liquid crystal display device as claimed in claim 1, wherein said first and second thicknesses fall in a range between 10–30 μm.

8. A color liquid crystal display device as claimed in claim 1, wherein said color liquid crystal display device further includes a retardation film between said first polarizer and said first liquid crystal panel, said retardation film having an optical axis perpendicular to a plane of said first liquid crystal panel.

9. A color liquid crystal display device as claimed in claim 8, wherein said retardation film has a birefringence $_A n'$, when viewed from a direction offset from said optical axis by 30 degrees, that satisfies a relationship $$\frac{1}{60} \cdot _A n(L) \cdot d \approx _A n' \cdot d \approx \frac{1}{30} \cdot _A n(L) \cdot d$$

wherein $_A n \cdot d$ represents the retardation of said first and second liquid crystal panels.

10. A color liquid crystal display device as claimed in claim 1, wherein one of said first and second liquid crystal panels carries thereon pixel electrodes and corresponding thin-film transistors such that each of said thin-film transistors energizes a corresponding pixel electrode.

11. A color liquid crystal display device comprising:

a first liquid crystal panel having upper and lower major surfaces for accommodating liquid crystal molecules, said first liquid crystal panel having a first thickness and a first predetermined twist angle crystal molecules in a first direction;

a second liquid crystal panel having upper and lower major surfaces for accommodating liquid crystal molecules, said second liquid crystal panel having a second thickness identical to said first thickness and a second predetermined twist angle of liquid crystal molecules in a second, opposite direction such that said second predetermined twist angle is identical with said first predetermined twist angle in terms of magnitude;

one of said first and second liquid crystal panels carrying electrode means for applying an electric field to said liquid crystal molecules therein;

said first and second liquid crystal panels being stacked such that said first liquid crystal panel is provided on said second liquid crystal panel to form a liquid crystal panel assembly;

a first polarizer provided on said first liquid crystal panel with a first polarization plane; and a second polarizer provided on said second liquid crystal panel with a second polarization plane;

said first and second polarizers being disposed to form one of a first state wherein said first and second polarization planes are parallel with each other and a second state wherein said first and second polarization planes intersect with each other perpendicularly;

said first and second thicknesses being set such that a retardation larger than 1000 nm is obtained in each of said first and second liquid crystal panels;

wherein each of said first and second liquid crystal panels include an upper molecular alignment layer and a lower molecular alignment layer that sandwich a liquid crystal layer therebetween, each of said upper and lower molecular alignment layers being formed of areas corresponding to pixels, each of said areas being formed of a first region having a first rubbing direction and a second region having a second, opposite rubbing direction, wherein said first region of said upper molecular alignment layer faces said first region of said lower molecular alignment layer across said liquid crystal layer, and wherein said second region of said upper molecular alignment layer faces said second region of said lower molecular alignment layer across said liquid crystal layer.

12. A color liquid crystal display device as claimed in claim 11 wherein said first and second regions of said upper molecular alignment layer provide respectively a low pretilt angle and a high pretilt angle to said liquid crystal molecules in said liquid crystal layer, and wherein said first and second regions of said lower molecular alignment layer provide respectively a high pretilt angle and a low pretilt angle to said liquid crystal molecules in said liquid crystal layer.

13. A color liquid crystal display device as claimed in claim 12 wherein said first region of said upper molecular alignment layer and said second region of said lower molecular alignment layer are formed of an inorganic material that provides said low pretilt angle, and wherein said second region of said upper molecular alignment layer and said first region of said lower molecular alignment layer are formed of an organic material that provides said high pretilt angle.

14. A color liquid crystal display device as claimed in claim 13, wherein said second region of said upper molecular alignment layer comprises a pattern of said organic material provided on a layer of said inorganic material, and wherein said second region of said lower molecular alignment layer comprises a pattern of said organic material provided on a layer of said inorganic material, wherein said pattern of said organic material exposes, in said upper molecular alignment layer, said layer of inorganic material as said second region, and wherein said pattern of said organic material exposes, in said lower molecular alignment layer, said layer of inorganic material as said first region.

15. A color liquid crystal display device as claimed in claim 12, wherein each of said areas further includes, in each of said upper and lower molecular alignment layers, third and fourth regions having third and fourth rubbing directions such that said third rubbing direction-is opposite to said fourth rubbing direction and such that each of said third and fourth rubbing directions is perpendicular to any of said first and second rubbing directions, wherein said upper and lower molecular alignment layers are disposed such that said third region of said upper molecular alignment layer faces said third region of said lower molecular alignment layer and such that said fourth region of said upper molecular alignment layer faces said fourth region of said lower molecular alignment layer.

* * * * *

UNITED STATES PATENT AND TRADEMARK OFFICE
CERTIFICATE OF CORRECTION

PATENT NO. : 5,570,211
DATED : October 29, 1996
INVENTOR(S) : Hanaoka et al.

It is certified that error appears in the above-indentified patent and that said Letters Patent is hereby corrected as shown below:

On the Title Page

In item [73] assignee, before "Japan" insert --Kawasaki,--.

Column 1, line 41, delete "ECS" and insert --ECB--.

Column 3, line 24, after "and" insert --24b.--.

Column 7, line 9, delete "stake" and insert --state--.

Column 7, line 40, delete "$\Delta$n" and insert --$_\Delta$n--.

Column 7, line 64, delete "ae" and insert --as--.

Column 8, line 13, after "polarizer" insert "35.".

Column 9, line 4, delete "b".

Column 9, line 17, delete "ae" and insert --as--.

UNITED STATES PATENT AND TRADEMARK OFFICE
CERTIFICATE OF CORRECTION

PATENT NO. : 5,570,211
DATED : October 29, 1996
INVENTOR(S) : Hanaoka et al.

It is certified that error appears in the above-indentified patent and that said Letters Patent is hereby corrected as shown below:

Column 9, line 18, delete "$_{42}v$" and insert --$_{\Delta}v$--.

Column 9, line 49, delete "$(33a_1)_2$." and insert --$(33b_1)_2$.--.

Column 9, lines 64-65, delete "$(33a_1)_1$ A" and insert --$(33a_1)A$--.

Column 9, line 66, delete "$(33_1)B$" and insert --$(33a_1)B$--.

Column 10, line 5, delete "$(33a_1)B$" and insert --$(33b_1)A$--.

Column 10, line 20, before "the process" insert --show--.

Column 10, line 24, delete "and $(33a_1)A$ with" and insert --and $(33b_1)A$ with--.

Column 10, line 25, delete "$(33b_1)A$" and insert --$(33a_1)A$--.

Column 11, line 21, delete "32" and insert -- = --.

UNITED STATES PATENT AND TRADEMARK OFFICE
CERTIFICATE OF CORRECTION

PATENT NO. : 5,570,211
DATED : October 29, 1996
INVENTOR(S) : Hanaoka et al.

It is certified that error appears in the above-indentified patent and that said Letters Patent is hereby corrected as shown below:

Column 11, line 24, delete "are".

Column 11, line 26, delete "e from" and insert --θ from--.

Column 11, line 42, delete both occurrences of "≈" and insert --≤-- in their places.

Column 11, line 67, delete "43c" and insert --43C--.

Column 13, line 15, delete "alignment," and insert --alignment --.

Column 13, line 21, delete "are," and insert --are--.

Column 13, line 50, delete both occurrences of "≈" and insert both --≤-- in their places.

UNITED STATES PATENT AND TRADEMARK OFFICE
CERTIFICATE OF CORRECTION

PATENT NO. : 5,570,211
DATED : October 29, 1996
INVENTOR(S) : Hanaoka et al.

It is certified that error appears in the above-indentified patent and that said Letters Patent is hereby corrected as shown below:

Column 13, line 63, before "crystal" insert --of liquid--.

Column 15, line 7, delete "-".

Signed and Sealed this

Twentieth Day of May, 1997

Attest:

BRUCE LEHMAN

Attesting Officer

Commissioner of Patents and Trademarks